Oct. 16, 1956 R. H. WITT 2,766,835
FRAME MEANS FOR RETAINING IMPLEMENT DRIVEN SHAFT PARALLEL
TO TRACTOR POWER TAKE-OFF SHAFT
Filed Nov. 24, 1952 2 Sheets-Sheet 1
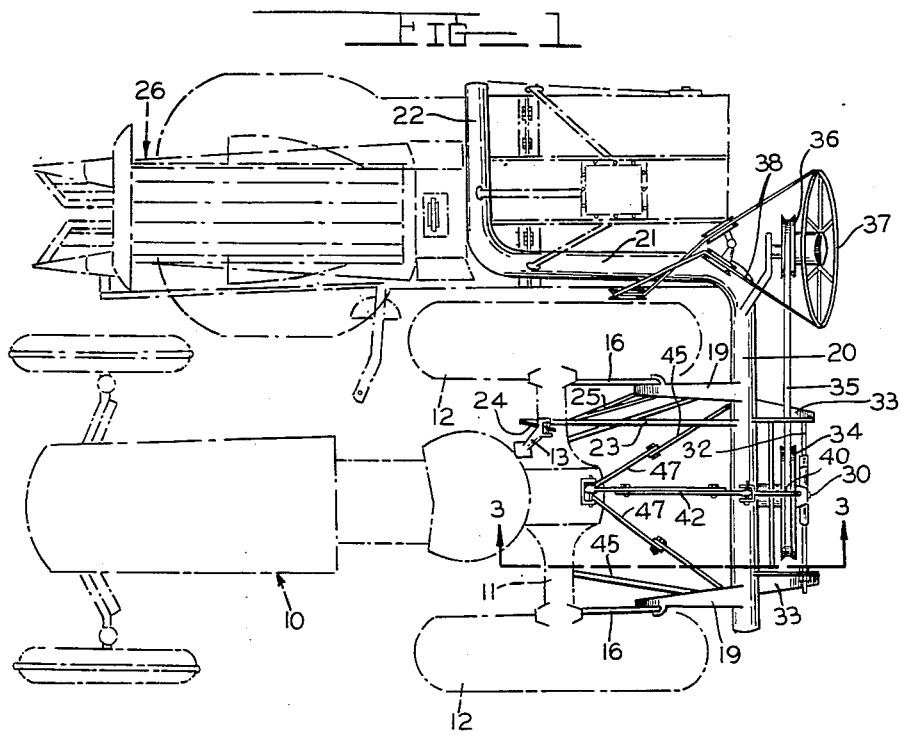
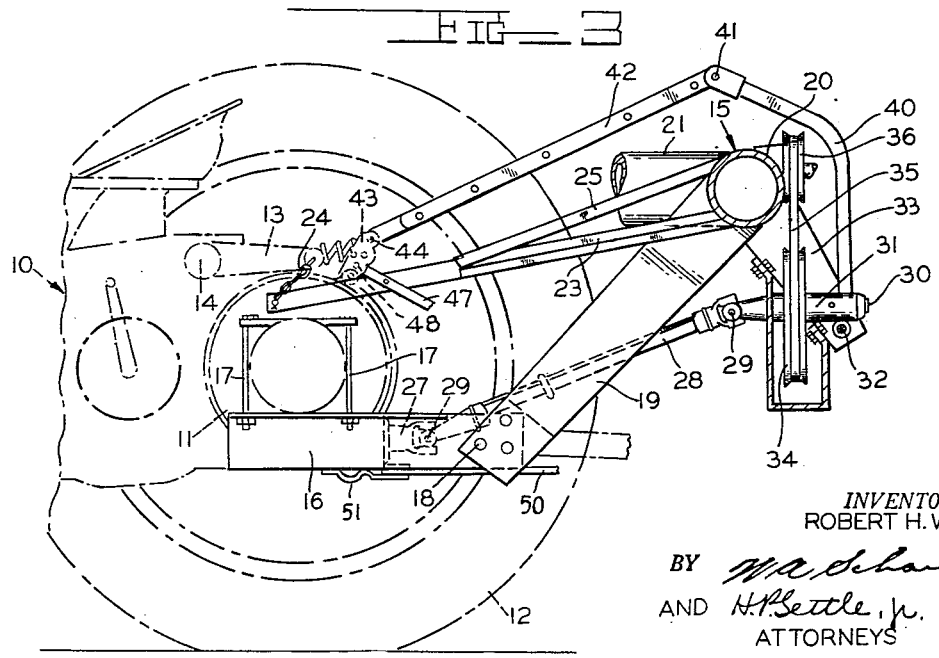
INVENTOR.
ROBERT H. WITT
BY
AND
ATTORNEYS

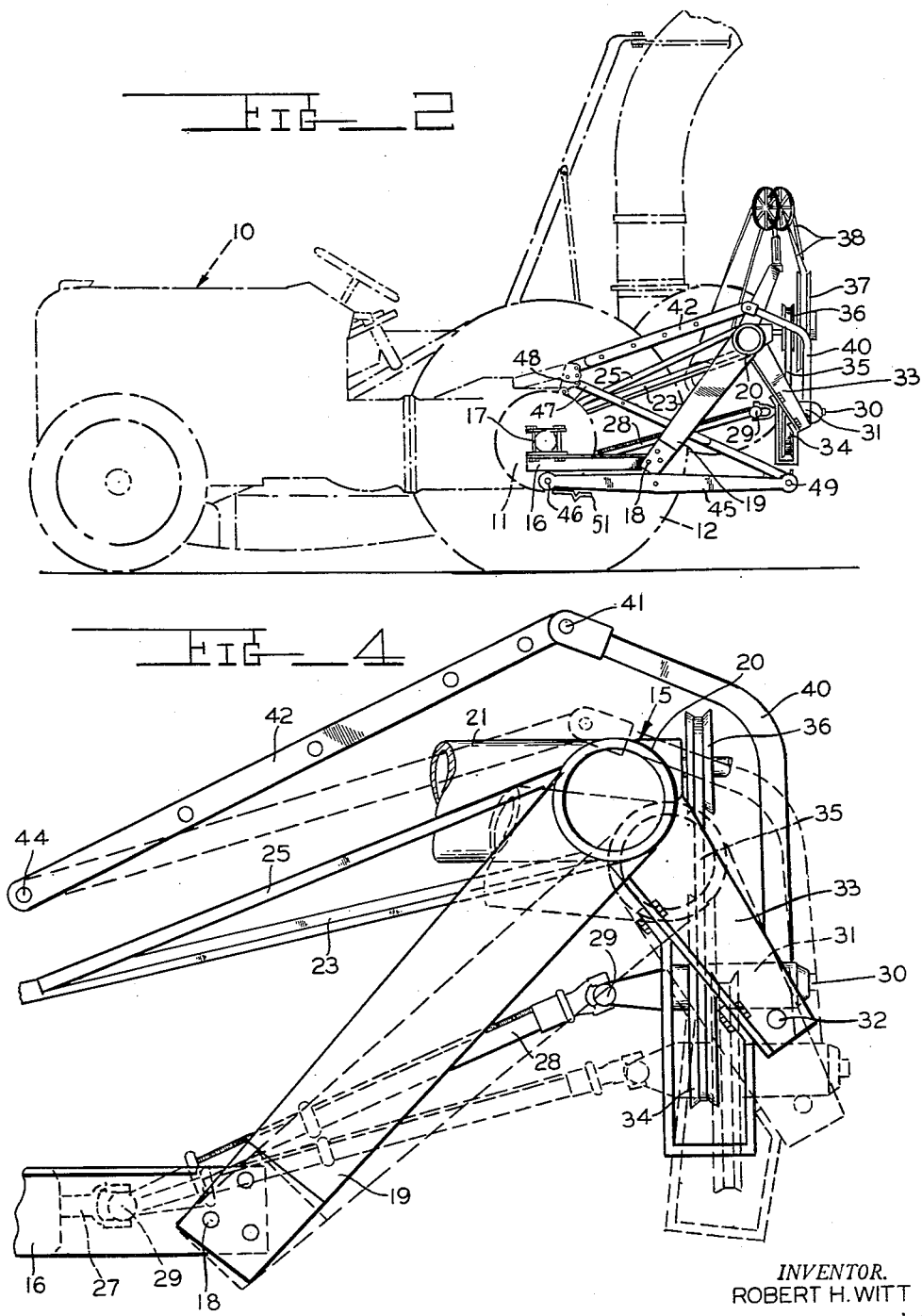

United States Patent Office 2,766,835
Patented Oct. 16, 1956

2,766,835

FRAME MEANS FOR RETAINING IMPLEMENT DRIVEN SHAFT PARALLEL TO TRACTOR POWER TAKE-OFF SHAFT

Robert H. Witt, Royal Oak, Mich., assignor, by mesne assignments, to Ford Motor Company, Dearborn, Mich., a corporation of Delaware Application November 24, 1952, Serial No. 322,232

4 Claims. (Cl. 180—53)

The present invention relates to a frame construction for a tractor-mounted implement, and more particularly to a tractor-mounted frame for disposing a power-liftable implement upon a tractor in such a manner that driving of the implement from the power-take-off is not impaired upon varying the relative positions of the tractor and the implement.

In the mounting of power-take-off driven implements upon a tractor or similar prime mover, considerable difficulty has been encountered in the maintenance of the proper driving relationship between the tractor and the implement during vertical adjustment of the implement. This problem is particularly bothersome where the implement is mounted upon a tractor having a power-liftable rock arm as a portion of the conventional tractor. It is necessary to provide adequate support for the implement upon the tractor and to adjust the implement vertically, while at the same time preventing the misalignment of the power means for driving the implement from the power-take-off.

The present invention provides an implement frame mounting for disposing a power-take-off driven implement upon the tractor for vertical movement. The tractor drives the implement through a drive shaft coupled to the tractor power-take-off and to a driven shaft on the implement. The driven shaft of the implement is pivotally disposed on the implement frame and is connected to the tractor through an articulated linkage, so that pivoted movement of the implement frame effects only relative vertical movement of the driven shaft with respect to the tractor. In this manner, the driven shaft of the implement is constrained to move in a path in which the driven shaft is always parallel to the driving shaft and the misalignment of the driving connection between the shafts never exceeds the practical safe-operation limitations thereof.

It is, therefore, an important object of the present invention to provide an implement mounting frame for adjustably disposing an implement upon a tractor in mounted relationship, so that an effective driving connection between the tractor and the implement is maintained.

Another important object is the provision of an implement mounting means including a driven shaft on the implement drivingly connectable to a driving shaft on the tractor and constrained for movement to a plurality of vertically adjusted positions at which the driven shaft is always parallel to the driving shaft.

A further important object is to provide an implement mounting frame adapted for mounting upon a tractor for pivoted movement about a horizontal axis and implement driving means carried by the frame and connected to the tractor for movement to a plurality of parallel positions during pivoted implement movement.

Still another important object of the present invention is the provision of an implement driving connection joining a driven implement element to a driving tractor element and means operative to adjustably position the driven element, so that pivoted movement of the implement relative to the tractor does not cause misalignment of the driving connection.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of an implement mounting frame of the present invention employed to dispose an implement, shown in dotted outline, upon a tractor, also shown in dotted outline;

Figure 2 is a side elevational view of the implement frame of Figure 1, further illustrating the relationship of the frame, the implement, and the tractor;

Figure 3 is an enlarged fragmentary sectional view of the frame shown in Figures 1 and 2, taken along the plane 3—3 of Figure 1; and Figure 4 is a greatly enlarged elevational view of the implement frame in Figures 1–3, illustrating the same in a pair of vertically adjusted positions.

As shown on the drawings:

Reference numeral 10 refers generally to a tractor of well-known make having a rear axle housing 11 joining rear tractor wheels 12 and surmounted by a power-liftable rock arm 13 pivoted to the tractor, as at 14. The power-liftable rock arm is actuated by the conventional tractor hydraulic system.

An implement frame, indicated generally at 15, is disposed upon the tractor through a pair of rearwardly extending support beams 16 fixedly connected to the rear axle housing 11 by clamp bolts 17 against rotational or pivotal movement. The beams 16 are apertured to receive therethrough a pivot bolt 18 serving to pivotally dispose a pivot arm 19 upon each beam, the pivot arms 19 being rigidly secured as their free rear ends to a laterally extending main frame structural element 20.

The main frame element 20 (Figure 1) extends laterally across the rear of the tractor beyond one of the tractor wheels 12, the element 20 being deflected forwardly generally parallel to the tractor, as at 21, to terminate in a lateral implement-supporting portion 22. The frame structural element 20 carries a forwardly extending actuating arm 23 rigidly secured thereto and having its forward end underlying the rock arm 13 and connected therethrough by suitable flexible or variable length means, as by a chain 24. The actuating arm 23 is strengthened by a diagonally extending brace 25.

It will be appreciated that actuation of the rock arm 13 will elevate and lower the forward end of the actuating arm 23 to pivot the frame 15 about the pivot point 18 to elevate the frame 20. Elevation and lowering of the frame will correspondingly lower and elevate the implement 26 carried by the frame. The greater portion of the implement's weight is forwardly of the frame 22 thus rocking the frame 20 counterclockwise about the pivot bolt 18 and maintaining the tension on the chain 24 as shown in Figure 3.

The implement 26 is driven by means of a power-take-off element 27 located centrally of the rear axle housing 11, at the lower portions thereof and driven by the tractor engine. The power output element 27 is drivingly connected, as by an extension shaft 28 having terminal universal joints 29, to a driven shaft 30 journaled by a shaft housing 31 carried by the implement upon a laterally extending pivot rod 32 projecting between a pair of rearwardly extending support plates 33 rigidly joined to the main frame element 20.

The shaft 30 has a driving sheave 34 keyed thereto for rotation therewith, so that the sheave is driven through the extension shaft 28. Drive belt 35, lapping the sheave 34, is utilized to drive an implement input sheave 36 and an adjacent sheave 37 lapped by an implement driving belt 38.

The shaft housing 31 is also supported by a link 40 joined rigidly to the housing and extending forwardly to overlie the main frame element 20. The free upper end of the link 40 is pivotally connected, as at 41, to an additional link 42 pivotally connected to the rear axle housing 11, as through mounting bracket 43 on pin 44.

It will be appreciated that pivoting movement of the frame 20 about the laterally aligned pivot points 18 would ordinarily cause severe misalignment of the generally parallel output shafts 27 and 30 which lie in a single vertical plane. If the shaft 30 were rigidly connected to the frame 15 through the rigid frame 20, such shaft misalignment would cause serious driving failure in the universal bearings 29 of the extension shaft 28.

It will be noted that the length of the top link 42 is substantially the same as the distance between the lateral pivot axes 18 and 32 and that the vertical distance between the pivot point 44, connecting the link 42 to the bracket 43, and the pivot point 18 is substantially the same as the distance between the pivot point 41 and the rear axis 32 about which the sheave 34 is pivotal. The pivot arm and frame connection between the axes 18 and 32, the tractor rear axle housing 11, the top link 42, and the arm 40 thus define a substantially parallel quadric linkage, and the parallelism existing within the linkage will connect the shaft housing 31 and the shaft 30 in parallelism with the shaft 39. Thus, the misalignment of the bearings 29 remains substantially constant despite vertical pivoted movement of the frame 20, as best shown in Figure 4, and no actual crimping of the bearings 29 can occur. Further, the vertical position of the power-take-off shaft 27 may be shifted without disturbing the parallelism between the shafts. In many instances a trailer is pulled by the tractor in connection with the implement. The hitching of the trailer may be accomplished by using the trailing draft members 45 pivotally connected at their forward ends to the axle housing 11 as at 46. A pair of angularly downwardly disposed stay bars 47 are connected at their forward ends to the mounted bracket 43 as at 48 and are secured with the rearward ends of the draft members 45 to the mounting pins 49 of a tranversely positioned draw bar (not shown). A tongue 50 (partially shown) is secured at its forward end to a clevis 51 mounted to the underside of axle housing 11 by conventional bolt means (not shown). The tongue 50 extends rearwardly beyond the draw bar (not shown) and ends in a conventional clevis arrangement (not shown). Lateral movement of the tongue 50 is prevented by a conventional securing of the tongue 50 to the draw bar, which is not shown in the drawings.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In combination, a tractor having a rear axle housing, a power output shaft located centrally of said axle housing, a power-liftable rock arm on said tractor, rearwardly extending mounting arms fixedly secured against rotational or pivotal movement to said rear axle housing, pivot arms carried by said mounting arms for pivoted movement about a lateral frame axis rearwardly of said axle, a laterally extending frame element rigidly carried by said pivot arms for movement about said lateral axis, means interconnecting said rock arm and said frame element to move said frame element, means on said frame element defining a lateral pivot axis, a shaft housing carried by said frame element for movement about said pivot axis, a power input shaft journaled by said shaft housing in longitudinal parallelism with said power output shaft, a driving connection between said shafts including universal joints on said shafts, respectively, a first generally vertically disposed link having one end rigidly connected to said shaft housing, and a second generally longitudinally extending link joining the free end of said first link to said rear axle housing, said first link being of a length substantially equal to the spacing of said lateral frame axis from the forward end of said second link, and said second link being of a length substantially equal to that from said lateral frame axis to said lateral pivot axis, whereby said links, in cooperation with said rear axle housing and said frame element, define a parallel quadric linkage effective to retain said input shaft generally parallel to said output shaft at all vertically adjusted positions of said frame element.

2. An implement frame mounting for a tractor having a rear axle housing, a power output shaft located centrally of said axle housing, and a power-liftable rock arm, comprising rearwardly extending mounting arms fixedly secured against rotational or pivotal movement to said rear axle housing, pivot arms carried by said mounting arms for pivoted movement about a lateral axis rearwardly of said axle, a laterally extending frame element carried by said pivot arms for movement about said lateral axis, means interconnecting said rock arm and said frame element to move said frame element, a shaft housing pivotally carried by said frame element for movement relative thereto about a lateral axis, a power input shaft journaled by said shaft housing in longitudinal parallelism with said power output shaft, a driving connection between said shafts, a first generally vertically disposed link having one end rigidly connected to said shaft housing, and a second generally longitudinally extending link joining the free end of said first link to said rear axle housing in vertically spaced relation to said power output shaft, said first link being of a length substantially equal to the spacing of said power output shaft from the forward end of said second link, and said second link being of a length substantially equal to that of said driving connection between said shafts, whereby said links are effective to retain said input shaft generally parallel to said output shaft at all vertically adjusted positions of said frame element.

3. A tractor having a rearwardly extending power output shaft, and an implement mounted on the rear of the tractor, said implement having frame means including a transverse frame member extending horizontally laterally behind the tractor, a first pivot supporting said frame member for pivotal movement about a transverse, horizontal axis, a shaft housing, a second transverse, horizontal pivot supporting said housing from the frame means and below the transverse frame member, a power input shaft journaled in said shaft housing, said power input shaft being parallel to but vertically offset from the power output shaft, a control member rigidly connected with the shaft housing and projecting upwardly above the level of the transverse frame member, a link extending forwardly from the upper end of the control member to the tractor, a third transverse, horizontal pivot connecting the upper end of the control member with the rear end of the link, a fourth transverse, horizontal pivot connecting the forward end of the link with the tractor, and means for vertically swinging the frame means about the first pivot to raise and lower said frame member, the four pivots lying at the corners of substantially a parallelogram-type linkage formed by the above-named elements connecting the pivots whereby, upon raising or lowering the frame member, the shaft housing is rotated about the second pivot to maintain the input shaft parallel with the output shaft.

4. A tractor as claimed in claim 3, in which the link extends upwardly behind and above the transverse frame member.

References Cited in the file of this patent

UNITED STATES PATENTS

| | | |
|---|---|---|
| 2,320,775 | Garner | June 1, 1943 |
| 2,462,588 | Wondra | Feb. 22, 1949 |
| 2,487,955 | Todd | Nov. 15, 1949 |
| 2,493,261 | Porter et al. | Jan. 3, 1950 |
| 2,517,163 | Arps | Aug. 1, 1950 |
| 2,545,236 | Lesniak | Mar. 13, 1951 |
| 2,581,535 | Jackson | Jan. 8, 1952 |
| 2,588,953 | Bausch et al. | Mar. 11, 1952 |
| 2,618,350 | Von Ruden | Nov. 18, 1952 |
| 2,691,932 | Sawyer et al. | Oct. 19, 1954 |
| 2,693,969 | Simpson | Nov. 9, 1954 |

FOREIGN PATENTS

| | | |
|---|---|---|
| 470,640 | Canada | Jan. 9, 1951 |